US012729122B2

(12) United States Patent
Kang et al.

(10) Patent No.: US 12,729,122 B2
(45) Date of Patent: Sep. 8, 2026

(54) METHOD FOR MANUFACTURING CARBON NANOTUBE DISPERSION

(71) Applicant: JEIO CO. LTD., Incheon (KR)

(72) Inventors: Yo Sub Kang, Incheon (KR); Tae Woong Kong, Seoul (KR)

(73) Assignee: JEIO CO. LTD., Incheon (KR)

( * ) Notice: Subject to any disclaimer, the term of this patent is extended or adjusted under 35 U.S.C. 154(b) by 0 days.

(21) Appl. No.: 18/567,300

(22) PCT Filed: May 24, 2022

(86) PCT No.: PCT/KR2022/007339
§ 371 (c)(1),
(2) Date: Dec. 5, 2023

(87) PCT Pub. No.: WO2023/277350
PCT Pub. Date: Jan. 5, 2023

(65) Prior Publication Data

US 2024/0279065 A1 Aug. 22, 2024

(30) Foreign Application Priority Data

Jun. 30, 2021 (KR) ........................ 10-2021-0085600

(51) Int. Cl.
*C01B 32/174* (2017.01)
*B82Y 40/00* (2011.01)
(Continued)

(52) U.S. Cl.
CPC .......... *C01B 32/174* (2017.08); *C01B 32/162* (2017.08); *C09D 7/20* (2018.01);
(Continued)

(58) Field of Classification Search
CPC ..... C01B 2202/03; C01B 32/174; C09D 7/70; C09D 7/20; C09D 17/002; H01G 11/36; B82Y 40/00; C08K 2201/006
(Continued)

(56) References Cited

U.S. PATENT DOCUMENTS 6,280,697 B1 * 8/2001 Zhou ...................... B82Y 40/00 429/231.95
2016/0020466 A1 * 1/2016 Ulbrich ................. H01M 4/525 252/511
(Continued)

FOREIGN PATENT DOCUMENTS

JP 2015-529558 A 10/2015
JP 2016-013680 A 1/2016
(Continued)

OTHER PUBLICATIONS

Translation of KR20130053015A (Year: 2013).*
(Continued)

*Primary Examiner* — Tri V Nguyen
(74) *Attorney, Agent, or Firm* — Bridgeway IP Law Group, PLLC; Jihun Kim

(57) ABSTRACT

Provided is a method for preparing a carbon nanotube dispersion including preparing a carbon nanotube bundle; post-processing the carbon nanotube bundle to reduce an average length of the carbon nanotube bundle to 50 µm or less; and dispersing the post-processed carbon nanotube bundle in a solution.

6 Claims, 11 Drawing Sheets

(51) Int. Cl.

| | |
|---|---|
| ***C01B 32/162*** | (2017.01) |
| ***C09D 7/20*** | (2018.01) |
| ***C09D 7/40*** | (2018.01) |
| ***C09D 7/61*** | (2018.01) |
| ***C09D 17/00*** | (2006.01) |
| ***H01G 11/36*** | (2013.01) |
| ***H01G 11/86*** | (2013.01) |
| ***H01M 4/62*** | (2006.01) |
| *B82Y 30/00* | (2011.01) |
| *C08K 3/04* | (2006.01) |

(52) U.S. Cl.
CPC ................. *C09D 7/61* (2018.01); *C09D 7/70* (2018.01); *C09D 17/002* (2013.01); *C09D 17/004* (2013.01); *H01G 11/36* (2013.01); *H01G 11/86* (2013.01); *H01M 4/625* (2013.01); *B82Y 30/00* (2013.01); *B82Y 40/00* (2013.01); *C01B 2202/22* (2013.01); *C01B 2202/32* (2013.01); *C01B 2202/36* (2013.01); *C01P 2004/03* (2013.01); *C01P 2006/22* (2013.01); *C08K 3/041* (2017.05); *C08K 2201/003* (2013.01); *C08K 2201/006* (2013.01); *C08K 2201/011* (2013.01)

(58) Field of Classification Search
USPC .......................................... 252/511; 977/842
See application file for complete search history.

(56) References Cited

U.S. PATENT DOCUMENTS

| | | | | |
|---|---|---|---|---|
| 2017/0036914 | A1* | 2/2017 | Sohn | C01B 32/176 |
| 2018/0175370 | A1* | 6/2018 | Kim | H01M 4/1391 |
| 2019/0263663 | A1 | 8/2019 | Yoon et al. | |

FOREIGN PATENT DOCUMENTS

| | | | | |
|---|---|---|---|---|
| JP | 2016-514080 | A | 5/2016 | |
| JP | 6054296 | B2 | 12/2016 | |
| JP | 2018-510768 | A | 4/2018 | |
| JP | 2020-029372 | A | 2/2020 | |
| JP | 2021-059473 | A | 4/2021 | |
| KR | 10-2010-0018787 | A | 2/2010 | |
| KR | 10-2013-0053015 | A | 5/2013 | |
| KR | 10-2015-0067104 | A | 6/2015 | |
| KR | 10-1807798 | B1 | 12/2017 | |
| KR | 10-2018-0081006 | A | 7/2018 | |
| KR | 10-2020-0077560 | A | 6/2020 | |
| WO | WO-2004060988 | A2 * | 7/2004 | B82Y 10/00 |
| WO | 2014/128190 | A1 | 8/2014 | |
| WO | WO-2015173589 | A2 * | 11/2015 | B01J 19/126 |
| WO | 2021/080006 | A1 | 4/2021 | |

OTHER PUBLICATIONS

Rubio "Ball-Milling Modification of Single-Walled Carbon Nanotubes: Purification, Cutting, and functionalization." small 2011, 7, No. 5, 665-674 (Year: 2011).*
Translation of WO2004060988 (Year: 2004).*

* cited by examiner

<Relationship between CNT average length and viscosity when performing dispersion by $T_1$>

<Predict viscosity when giving CNT length when performing dispersion by $T_1$>

METHOD FOR MANUFACTURING CARBON NANOTUBE DISPERSION

TECHNICAL FIELD

The present disclosure relates to a method for preparing a carbon nanotube dispersion.

BACKGROUND ART

Carbon nanotubes may have excellent mechanical robustness and chemical stability, have both semiconductor and conductor properties, and have small diameters, large lengths, and hollow properties, and thus are suitable as materials for flat panel displays, transistors, energy storage media, etc. and have high potential for application as various nano-sized electronic devices.

In order to use carbon nanotubes for forming conductive films or manufacturing various other electronic devices, the carbon nanotubes need to be effectively dispersed in a matrix such as a solvent or binder. However, the carbon nanotubes have a strong tendency to aggregate into bundles within the matrix due to strong Van der Waals forces and thus have a disadvantage of making processing difficult due to very low solubility in water or other solvents.

When the carbon nanotubes aggregate within the matrix, there may be problems that the unique properties of the carbon nanotubes may not be exhibited, or the uniformity of thin film properties deteriorates when manufactured as a thin film. In particular, the dispersion of carbon nanotubes is more important in display applications where transparency needs to be secured, like the case of using a transistor as a semiconductor material or an electrode as a conductor material. However, when the dispersibility is poor, carbon nanotube strands are not completely separated but aggregate in bundles, so that the desired transmittance cannot be secured even if the same performance is achieved.

However, carbon nanotubes used in a conventional method of preparing a carbon nanotube dispersion tend to rapidly increase and then decrease in viscosity of the dispersion as the dispersion energy increases, and such an irregular change in viscosity increases variables in the preparing process of the carbon nanotube dispersion to cause problems in efficiently preparing the dispersion.

Accordingly, if the tendency of the viscosity can be predicted during the preparing process of the carbon nanotube dispersion, process efficiency may be increased.

Korean Patent Registration No. 10-1807798 relates to a carbon nanotube dispersion and a preparing method thereof. In Korean Patent Registration No. 10-1807798, there is disclosed a method for preparing a carbon nanotube dispersion with excellent dispersibility, dispersion stability and adhesion, but it is not disclosed to have a predictable viscosity tendency using carbon nanotubes of which an average length is controlled.

DISCLOSURE

Technical Problem

An object to be achieved by the present disclosure is to provide a method for preparing a carbon nanotube dispersion having a predictable viscosity tendency during a dispersion process by controlling an average length of carbon nanotubes.

Another object to be achieved by the present disclosure is to provide a carbon nanotube dispersion prepared by the preparing method.

Yet another object to be achieved by the present disclosure is to provide an energy storage device including the carbon nanotube dispersion.

Yet another object to be achieved by the present disclosure is to provide a composite material including the carbon nanotube dispersion.

Yet another object to be achieved by the present disclosure is to provide a pigment including the carbon nanotube dispersion.

Yet another object to be achieved by the present disclosure is to provide a paint including the carbon nanotube dispersion.

However, the technical challenges sought to be achieved by the embodiments of the present application are not limited to the technical challenges described above, and other technical challenges may exist.

Technical Solution

According to a first aspect of the present disclosure, there is provided a method for preparing a carbon nanotube dispersion including preparing a carbon nanotube bundle; post-processing the carbon nanotube bundle to reduce an average length of the carbon nanotube bundle to 50 μm or less; and dispersing the post-processed carbon nanotube bundle in a solution.

According to an exemplary embodiment of the present disclosure, a volume-average (cumulative) diameter Dv(90) of the post-processed carbon nanotube bundle may be 50 μm, but is not limited thereto.

According to an exemplary embodiment of the present disclosure, the solution may include a solvent and a dispersant, but is not limited thereto.

According to an exemplary embodiment of the present disclosure, the solvent may be selected from the group consisting of deionized water, N-methyl-2-pyrrolidone, N,N-dimethylformamide, N,N-dimethylacetamide, dimethyl sulfoxide, ethanol, methanol, pentyl alcohol, acetone, methyl ethyl ketone, cyclopentanone, ethyl acetate, ethylene glycol, diethylene glycol, 1-propanol, isopropanol, 1-butanol, isobutanol, octanol, ethylene glycol monoethyl ether, diethylene glycol monoethyl ether, triethylene glycol monoethyl ether, tetraethylene glycol monoethyl ether, and combinations thereof, but is not limited thereto.

According to an exemplary embodiment of the present disclosure, the dispersant may be selected from the group consisting of polyvinylpyrrolidone, hydrogenated nitrile rubber, polyvinyl alcohol, polyvinyl methyl ether, polyethylene glycol, polypropylene glycol, polyacrylamide, polyethylene oxide, polyethylene oxide/propylene oxide block copolymer, polyacrylic acid salts, cellulose derivatives, starch derivatives, and combinations thereof, but is not limited thereto.

According to an exemplary embodiment of the present disclosure, the carbon nanotubes may be prepared by chemical vapor deposition in the presence of a catalyst, but are not limited thereto.

According to an exemplary embodiment of the present disclosure, the carbon nanotubes may be prepared using a reaction source selected from the group consisting of acetylene, ethylene, methane, and combinations thereof, but are not limited thereto.

According to an exemplary embodiment of the present disclosure, the catalyst may include a catalyst selected from the group consisting of Fe, Co, Ni, Al, Mg, Mo, Si, and combinations thereof, but is not limited thereto.

According to an exemplary embodiment of the present disclosure, the catalyst may be prepared by a method selected from the group consisting of a combusting method, a supporting method, a probing method, a sol-gel method, and combinations thereof, but is not limited thereto.

According to an exemplary embodiment of the present disclosure, the dispersing step may be performed by a process selected from the group consisting of an ultrasonic process, a pulverization process by physical impact force, a pulverization process by physical shear force, a high pressure process, a supercritical/subcritical process, and combinations thereof, but is not limited thereto.

According to an exemplary embodiment of the present disclosure, the post-processing may include dry post-processing and/or wet post-processing, but is not limited thereto.

According to an exemplary embodiment of the present disclosure, the dry post-processing may be selected from the group consisting of air dry mill, bead mill, attrition mill, jet mill, steam jet mill, and combinations thereof, but is not limited thereto.

According to an exemplary embodiment of the present disclosure, the wet post-processing may be selected from the group consisting of bead mill, attrition mill, sonication, shear mill, high pressure homogenizer, mechanical homogenizer and combinations thereof, but is not limited thereto.

According to an exemplary embodiment of the present disclosure, the post-processed carbon nanotubes may have a specific surface area of 50 $cm^2/g$ or more and a diameter of 1 nm or more, but are not limited thereto.

According to a second aspect of the present disclosure, there is provided a carbon nanotube dispersion prepared by the method according to the first aspect of the present disclosure, in which a saturation point according to the dispersion energy of a viscosity (u) of the carbon nanotube dispersion is proportional to an average length value of the post-processed carbon nanotubes.

According to a third aspect of the present disclosure, there is provided an energy storage device including the carbon nanotube dispersion according to the second aspect of the present disclosure.

According to a fourth aspect of the present disclosure, there is provided a composite material including the carbon nanotube dispersion according to the second aspect of the present disclosure.

According to a fifth aspect of the present disclosure, there is provided a pigment including the carbon nanotube dispersion according to the second aspect of the present disclosure.

According to a sixth aspect of the present disclosure, there is provided a paint including the carbon nanotube dispersion according to the second aspect of the present disclosure.

The above-mentioned technical solutions are merely exemplary and should not be construed as limiting the present disclosure. In addition to the above-described exemplary examples, additional examples may exist in the drawings and detailed description of the invention.

Advantageous Effects

In a conventional method of preparing a carbon nanotube dispersion, the viscosity of the dispersion tended to be changed irregularly as dispersion energy was applied. Such an irregular change in viscosity has a problem of reducing process efficiency when preparing the dispersion.

However, in the method for preparing the carbon nanotube dispersion according to the present disclosure, it is possible to predict and improve efficiency of the carbon nanotube dispersion process using material properties according to the length of the carbon nanotubes, and input dispersion energy and viscosity properties according to the length of the carbon nanotubes.

Specifically, the dispersion is prepared by controlling the length of the carbon nanotube bundle to 50 μm or less to have a different aspect from the viscosity tendency of the conventional carbon nanotube dispersion, and to predict and improve process efficiency during the dispersion process using the viscosity tendency.

Specifically, as a result, the saturation point according to the dispersion energy of the viscosity (u) of the carbon nanotube dispersion according to the present disclosure is proportional to the average length of the carbon nanotubes.

However, effects obtainable herein are not limited to the effects described above, and other effects may be present.

BEST MODE

Figure 1:
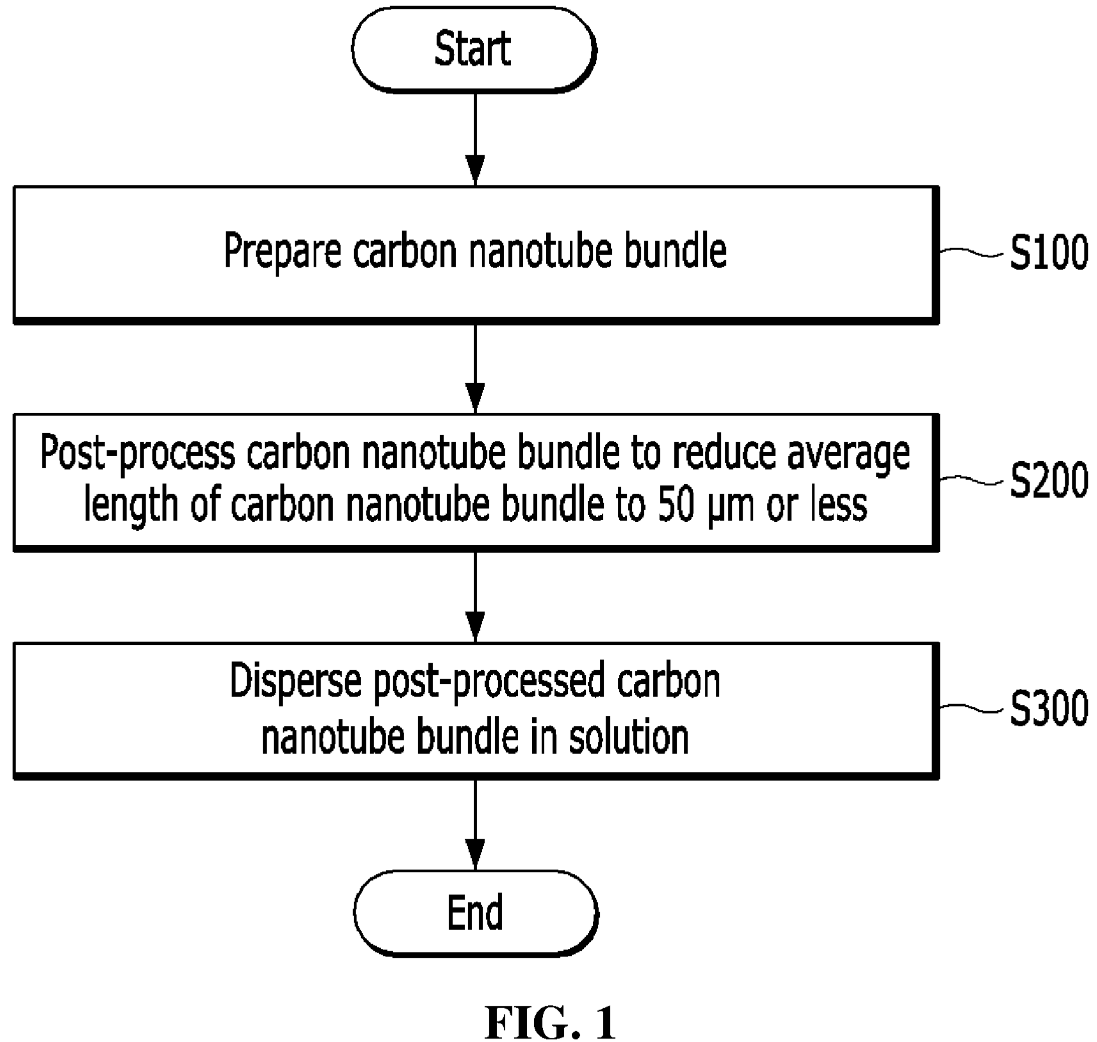
FIG. 1 is a flowchart of a method for preparing a carbon nanotube dispersion according to an exemplary embodiment of the present disclosure.

Hereinafter, Examples of the present disclosure will be described in detail so as to be easily implemented by those skilled in the art, with reference to the accompanying drawings.

However, the present disclosure may be embodied in many different forms and are not limited to the examples to be described herein. In addition, parts not related with the description have been omitted in order to clearly describe the present disclosure in the drawings and throughout the present specification, like reference numerals designate like elements.

Throughout this specification, when a certain part is "connected" with the other part, it is meant that the certain part may be "directly connected" with the other part and "electrically connected" with the other part with another element interposed therebetween.

Throughout the present specification, it will be understood that when a certain member is located "on", "above", "at the top of", "under", "below", and "at the bottom of" the other member, a certain member is in contact with the other member and another member may also be present between the two members.

Throughout this specification, unless explicitly described to the contrary, when a certain part "includes" a certain component, it will be understood to further include another component without excluding another component.

The terms "about", "substantially", and the like to be used in the present specification are used as a numerical value or a value close to the numerical value when inherent manufacturing and material tolerances are presented in the stated meaning, and used to prevent an unscrupulous infringer from unfairly using disclosed contents in which precise or absolute numerical values are mentioned to help in the understanding of the present disclosure. Throughout this specification, the term of "step to" or "step of" does not mean "step for".

Throughout the present specification, the term "combinations thereof" included in the expression of the Markush form means one or more mixtures or combinations selected from the group consisting of components described in the expression of the Markush form, and means to include at least one selected from the group consisting of the components.

Throughout the present specification, "A and/or B" means "A or B, or A and B".

Hereinafter, a method for preparing a carbon nanotube dispersion according to the present disclosure will be described in detail with reference to exemplary embodiments, Examples, and drawings. However, the present disclosure is not limited to these exemplary embodiments, Examples and drawings.

According to a first aspect of the present disclosure, there is provided a method for preparing a carbon nanotube dispersion including preparing a carbon nanotube bundle; post-processing the carbon nanotube bundle to reduce an average length of the carbon nanotube bundle to 50 μm or less; and dispersing the post-processed carbon nanotube bundle in a solution.

In a conventional method of preparing a carbon nanotube dispersion, the viscosity of the dispersion tended to be changed irregularly as dispersion energy was applied. Such an irregular change in viscosity has a problem of reducing process efficiency when preparing the dispersion.

However, in the method for preparing the carbon nanotube dispersion according to the present disclosure, it is possible to predict and improve efficiency of the carbon nanotube dispersion process using material properties according to the length of the carbon nanotubes, and input dispersion energy and viscosity properties according to the length of the carbon nanotubes.

Specifically, in the present disclosure, by preparing the dispersion by controlling the length of the carbon nanotube bundle to 50 μm or less, unlike the viscosity tendency of the conventional carbon nanotube dispersion, as dispersion energy is applied, there is a point where the viscosity is increased and then saturated, and a saturation point according to the dispersion energy of the viscosity (u) of the carbon nanotube dispersion tends to be proportional to the average length value of the carbon nanotubes. It is possible to predict and improve process efficiency during the dispersing process using such viscosity tendency.

Hereinafter, a method for preparing a carbon nanotube dispersion of the present disclosure will be described with reference to FIG. 1.

FIG. 1 is a flowchart of a method for preparing a carbon nanotube dispersion according to an exemplary embodiment of the present disclosure.

First, the carbon nanotube bundle is prepared (S100).

According to an exemplary embodiment of the present disclosure, the carbon nanotubes may be prepared by chemical vapor deposition in the presence of a catalyst, but are not limited thereto.

According to an exemplary embodiment of the present disclosure, the carbon nanotubes may be prepared using a reaction source selected from the group consisting of acetylene, ethylene, methane, and combinations thereof, but are not limited thereto.

According to an exemplary embodiment of the present disclosure, the catalyst may include a catalyst selected from the group consisting of Fe, Co, Ni, Al, Mg, Mo, Si, and combinations thereof, but is not limited thereto.

According to an exemplary embodiment of the present disclosure, the catalyst may be prepared by a method selected from the group consisting of a combusting method, a supporting method, a probing method, a sol-gel method, and combinations thereof, but is not limited thereto.

Although described below, the average length of the carbon nanotube bundle may be controlled by performing dry post-processing and/or wet post-processing.

When performing the dry post-processing, the length of the carbon nanotubes is controlled by directly using the prepared carbon nanotube bundle, and then a carbon nanotube dispersion may be prepared.

When performing the wet post-processing, the length of the carbon nanotubes is controlled using a solution in which the carbon nanotube bundle is added to a solvent (water, ethanol, etc.), the solution is dried to be prepared in a powder state, and then the carbon nanotube dispersion may be prepared.

Accordingly, in the preparing of the carbon nanotube bundle, the carbon nanotube bundle may be prepared in a solid phase (carbon nanotube bundle) or a liquid phase (solution containing the carbon nanotube bundle) depending on how post-processing is performed.

Next, the carbon nanotube bundle is post-processed to reduce the average length of the carbon nanotube bundle to 50 μm or less (S200).

According to an exemplary embodiment of the present disclosure, a volume-average (cumulative) diameter Dv(90) of the post-processed carbon nanotube bundle may be 50 μm, but is not limited thereto.

The volume-average (cumulative) diameter is considered as a sphere having the same volume because the sizes of non-spherical particles may not be expressed as one value, and Dv(10) refers to a size at 10% of the entire particle size distribution, Dv(50) refers to a size at 50% of the entire particle size distribution (median value), and Dv(90) refers to a size at 90% of the entire particle size distribution.

Accordingly, the volume-average (cumulative) diameter Dv(90) of 50 μm means that 90% of the particle sizes are 50 μm or less, which is able to be interpreted as the majority of the particle sizes are 50 μm or less.

According to an exemplary embodiment of the present disclosure, the post-processed carbon nanotubes may have a specific surface area of 50 $cm^2/g$ or more and a diameter of 1 nm or more, but are not limited thereto.

According to an exemplary embodiment of the present disclosure, the post-processing may include dry post-processing and/or wet post-processing, but is not limited thereto.

As described above, when performing the dry post-processing, the post-processing is performed by directly using the prepared carbon nanotube bundle, and the carbon nanotube dispersion may be prepared using the post-processed carbon nanotubes.

On the other hand, when performing the wet post-processing, the post-processing may be performed using a solution in which the carbon nanotube bundle is added to a solvent (water, ethanol, etc.), and the carbon nanotubes in which the length is controlled through the wet post-processing are dried to be prepared in a powder state, and then used for the preparation of the carbon nanotube dispersion.

According to an exemplary embodiment of the present disclosure, the dry post-processing may be selected from the group consisting of an air dry mill, a bead mill, an attrition mill, a jet mill, a steam jet mill, and combinations thereof, but is not limited thereto.

According to an exemplary embodiment of the present disclosure, the wet post-processing may be selected from the group consisting of bead mill, attrition mill, sonication, shear mill, high pressure homogenizer, mechanical homogenizer and combinations thereof, but is not limited thereto.

Finally, the post-processed carbon nanotube bundle is dispersed in the solution (S300).

According to an exemplary embodiment of the present disclosure, the step of dispersing the post-processed carbon nanotube bundle in the solution may be further included, but is not limited thereto.

According to an exemplary embodiment of the present disclosure, the solution may include a solvent and a dispersant, but is not limited thereto.

According to an exemplary embodiment of the present disclosure, the solvent may be selected from the group consisting of deionized water, N-methyl-2-pyrrolidone, N,N-dimethylformamide, N,N-dimethylacetamide, dimethyl sulfoxide, ethanol, methanol, pentyl alcohol, acetone, methyl ethyl ketone, cyclopentanone, ethyl acetate, ethylene glycol, diethylene glycol, 1-propanol, isopropanol, 1-butanol, isobutanol, octanol, ethylene glycol monoethyl ether, diethylene glycol monoethyl ether, triethylene glycol monoethyl ether, tetraethylene glycol monoethyl ether, and combinations thereof, but is not limited thereto.

According to an exemplary embodiment of the present disclosure, the dispersant may be selected from the group consisting of polyvinylpyrrolidone, hydrogenated nitrile rubber, polyvinyl alcohol, polyvinyl methyl ether, polyethylene glycol, polypropylene glycol, polyacrylamide, polyethylene oxide, polyethylene oxide/propylene oxide block copolymer, polyacrylic acid salts, cellulose derivatives, starch derivatives, and combinations thereof, but is not limited thereto.

According to an exemplary embodiment of the present disclosure, the dispersing step may be performed by a process selected from the group consisting of an ultrasonic process, a pulverization process by physical impact force, a pulverization process by physical shear force, a high pressure process, a supercritical/subcritical process, and combinations thereof, but is not limited thereto.

In addition, according to a second aspect of the present disclosure, there is provided a carbon nanotube dispersion prepared by the method according to the first aspect of the present disclosure, in which a saturation point according to the dispersion energy of a viscosity (u) of the carbon nanotube dispersion is proportional to an average length value of the post-processed carbon nanotubes.

With respect to the carbon nanotube dispersion according to the second aspect of the present disclosure, the detailed description of duplicated parts with the first aspect of the present disclosure has been omitted, but even if the description thereof has been omitted, the contents described in the first aspect of the present disclosure may be equally applied to the second aspect of the present disclosure.

The carbon nanotubes according to the present disclosure have an average length of 50 μm or less, and accordingly, have a different aspect from the tendency of the viscosity change of conventional carbon nanotubes. As the conventional carbon nanotube dispersion increases the dispersion energy, the viscosity has been irregularly changed, but in the carbon nanotube dispersion according to the present disclosure, as the dispersion energy increases, there is a saturation point where the viscosity increases and then becomes constant, and the saturation point decreases as the average length of the carbon nanotubes decreases.

Figure 2:
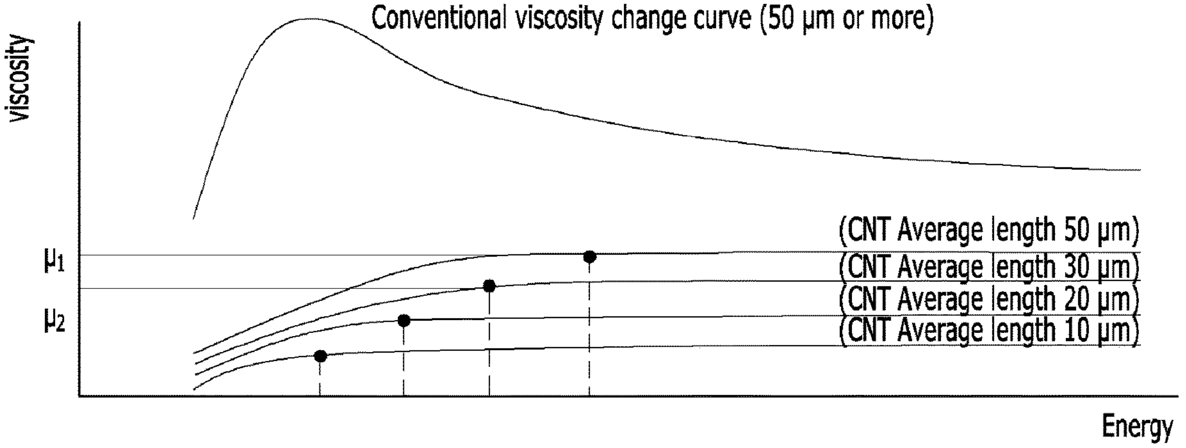
FIG. 2 is a distributed energy-viscosity curve according to the length of carbon nanotubes according to an exemplary embodiment of the present disclosure.

FIG. 2 is a distributed energy-viscosity curve according to the length of carbon nanotubes according to an exemplary embodiment of the present disclosure.

Referring to FIG. 2, it may be confirmed that when the average length of the carbon nanotubes is 50 μm or more, as the dispersion energy increases, the viscosity increases rapidly and then tends to decrease. This irregular change in viscosity increases the process variables during the preparing process of the dispersion, and thus there is a limit to operating an efficient process.

On the other hand, when the average length of the carbon nanotubes is 50 μm or less, it may be confirmed that there is a saturation point where the viscosity increases and then becomes constant as the dispersion energy increases. The saturation point decreases as the average length of carbon nanotubes decreases. Accordingly, a relationship between the average length of carbon nanotubes and the viscosity of the dispersion is represented by a viscosity index of the dispersion according to the length of the carbon nanotubes, thereby predicting and improving the efficiency of the process when preparing the dispersion.

Figure 3:
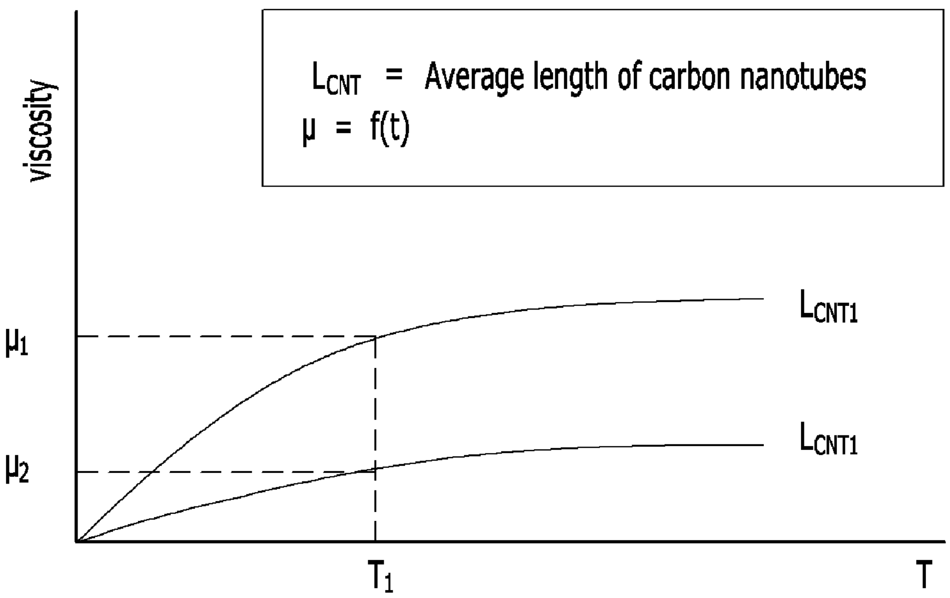
FIG. 3 is a graph showing a viscosity index of the dispersion according to the length of carbon nanotubes according to an exemplary embodiment of the present disclosure.
Figure 3:
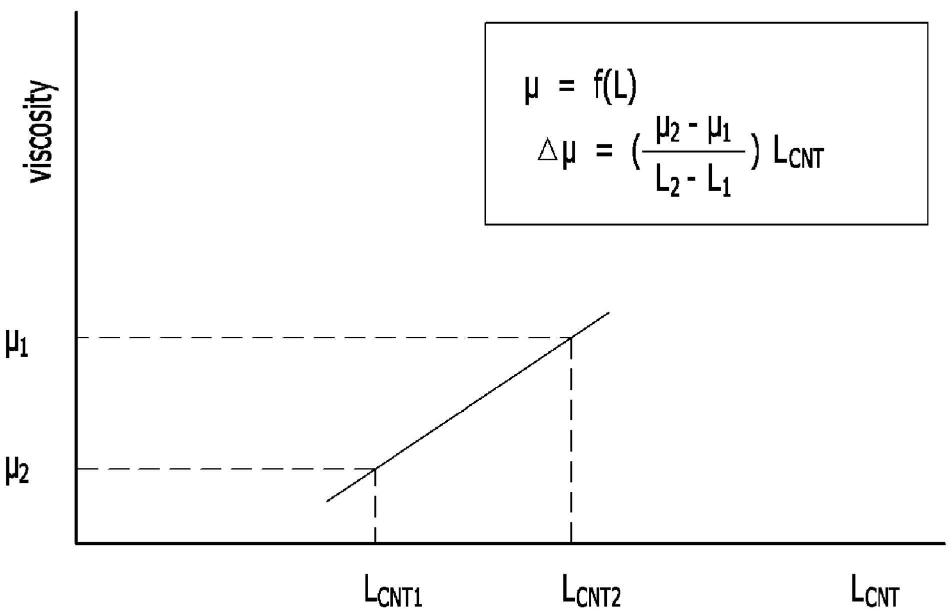

FIG. 3 is a graph showing a viscosity index of the dispersion according to the length of carbon nanotubes according to an exemplary embodiment of the present disclosure.

Hereinafter, the viscosity index of the dispersion according to the length of the carbon nanotube is defined with reference to FIG. 3.

The viscosity may be represented as a value obtained by dividing shear stress by a shear rate. The shear stress is an expression of a cross-sectional area A ($cm^2$), which is a part where each fluid layer is in contact with each other when each fluid layer was considered three-dimensional. Specifically, when a constant force F (dynes) is applied to the upper part of the fluid layer, a constant force F (dynes) is generated at the contact surface of each fluid layer, that is, the cross-sectional area A ($cm^2$). At this time, the force received per cross-sectional area of the fluid layer is the shear stress. In other words, a value obtained by dividing a friction force F (dynes) by a unit area A ($cm^2$) is the shear stress F/A ($dynes/cm^2$).

A stationary phase and a mobile phase exist at a predetermined distance X (cm), and a fluid also exists between the phases. When the upper plate, that is, the mobile phase is moved from the outside with a constant force, the fluid also moves at a constant velocity V (cm/sec). The farther the fluid is from the mobile phase, the slower the velocity is, and the velocity distribution of the fluid flow is linear. The shear rate V/X (sec-1) is a value obtained by dividing a fluid velocity V (cm/sec) between the two plates by a distance X (cm) between the two plates.

The viscosity is a value obtained by dividing the shear stress (dynes/$cm^2$) by the shear rate ($sec^{-1}$), and ultimately, the viscosity may be represented as [Equation 1] below.

$$\mu = M/(L \cdot T)(g/cm \cdot s) \quad \text{[Equation 1]}$$

(wherein,

M represents a factor caused by a force;

L represents a distance between the mobile phase fluid and the stationary phase fluid; and T represents a measurement time).

Referring to FIG. 3, as defined in [Equation 1], the viscosity may represent $\mu_1=M_1/(L_1 \cdot T_1)$ (g/cm·s) and $\mu_2=M_2/(L_2 \cdot T_2)$ (g/cm·s) ($\mu_1$ is the viscosity of a dispersion with an average length of carbon nanotubes of 50 μm, and $\mu_2$ is the viscosity of a dispersion with an average length of carbon nanotubes of 30 μm), and because L and T are fixed constant values, a viscosity change Δμ may be expressed as follows.

$$\Delta\mu = \mu_1 - \mu_2 = \{M_1/(L_1 \cdot T_1)\} - \{M_2/(L_2 \cdot T_2)\} = (M_1 - M_2)/(L \cdot T)$$

From experimental data, it may be seen that $\mu_1$ is always larger than $\mu_2$.

That is, since $\mu_1>\mu_2$, and L and T are constants, it may be seen that $M_1>M_2$ and the average length of M and the carbon nanotubes are proportional to each other, and in other words, $M=\alpha L_{CNT}$.

Accordingly, the viscosity change Δμ may be represented as $\Delta\mu=\alpha\Delta L_{CNT}/(L \cdot T)=\lambda\Delta L_{CNT}$, wherein λ is a dispersion viscosity index according to the length of the carbon nanotube. By using this, it is possible to predict the viscosity according to the length of the carbon nanotube and to improve the efficiency of the process.

Referring to FIG. 3, it may be seen that it is possible to predict the viscosity at the same time when the dispersion is performed in the same process. For example, when $T_1$ is 5 hours, if $L_{CNT1}$=50 μm and $\mu_1$=2000 cp, and $L_{CNT2}$=10 μm and $\mu_2$=200 cp, it may be seen that a viscosity change $\Delta\mu=[(2000-200)/(50-10)]L_{CNT}=45\ L_{CNT}$, and if the average length of the carbon nanotubes is 20 μm, it is expectable that the viscosity after 5 hours is 900 cp.

In addition, according to a third aspect of the present disclosure, there is provided an energy storage device including the carbon nanotube dispersion according to the second aspect of the present disclosure.

With respect to the energy storage device according to the third aspect of the present disclosure, the detailed description of parts duplicated with the second aspect of the present disclosure has been omitted, but even if the description has been omitted, the contents disclosed in the second aspect of the present disclosure may be equally applied to the third aspect of the present disclosure.

In addition, according to a fourth aspect of the present disclosure, there is provided a composite material including the carbon nanotube dispersion according to the second aspect of the present disclosure.

With respect to the composite material according to the fourth aspect of the present disclosure, the detailed description of parts duplicated with the second aspect of the present disclosure has been omitted, but even if the description has been omitted, the contents disclosed in the second aspect of the present disclosure may be equally applied to the fourth aspect of the present disclosure.

In addition, according to a fifth aspect of the present disclosure, there is provided a pigment including the carbon nanotube dispersion according to the second aspect of the present disclosure.

With respect to the pigment according to the fifth aspect of the present disclosure, the detailed description of parts duplicated with the second aspect of the present disclosure has been omitted, but even if the description has been omitted, the contents disclosed in the second aspect of the present disclosure may be equally applied to the fifth aspect of the present disclosure.

In addition, according to a sixth aspect of the present disclosure, there is provided a paint including the carbon nanotube dispersion according to the second aspect of the present disclosure.

With respect to the paint according to the sixth aspect of the present disclosure, the detailed description of parts duplicated with the second aspect of the present disclosure has been omitted, but even if the description has been omitted, the contents disclosed in the second aspect of the present disclosure may be equally applied to the sixth aspect of the present disclosure.

Hereinafter, the present disclosure will be described in more detail with reference to the following Examples, but the following Examples are only for illustrative purposes and are not intended to limit the scope of the present disclosure.

[Example 1] Preparation of Carbon Nanotube Dispersion (Average Length of 50 μm or Less)

First, pre-processing of the carbon nanotube length was performed at 700 rpm for 5 minutes by mixing zirconia balls (3 mm in diameter) and carbon nanotubes (JEIO, 10B) in an air dry mill (KMtech, KADM-5).

Next, 1 wt % of carbon nanotubes (average length of 50 μm) and 0.5 wt % of polyvinylpyrrolidone (PVP) were mixed with 98.5 wt % of a NMP solvent, and a carbon nanotube dispersion was prepared in a bead mill (WAB, DYNO-MILL ECM-AP) at a zirconia ball (1 mm in diameter) filling rate of 30% and a velocity of 1000 rpm.

Figure 4:
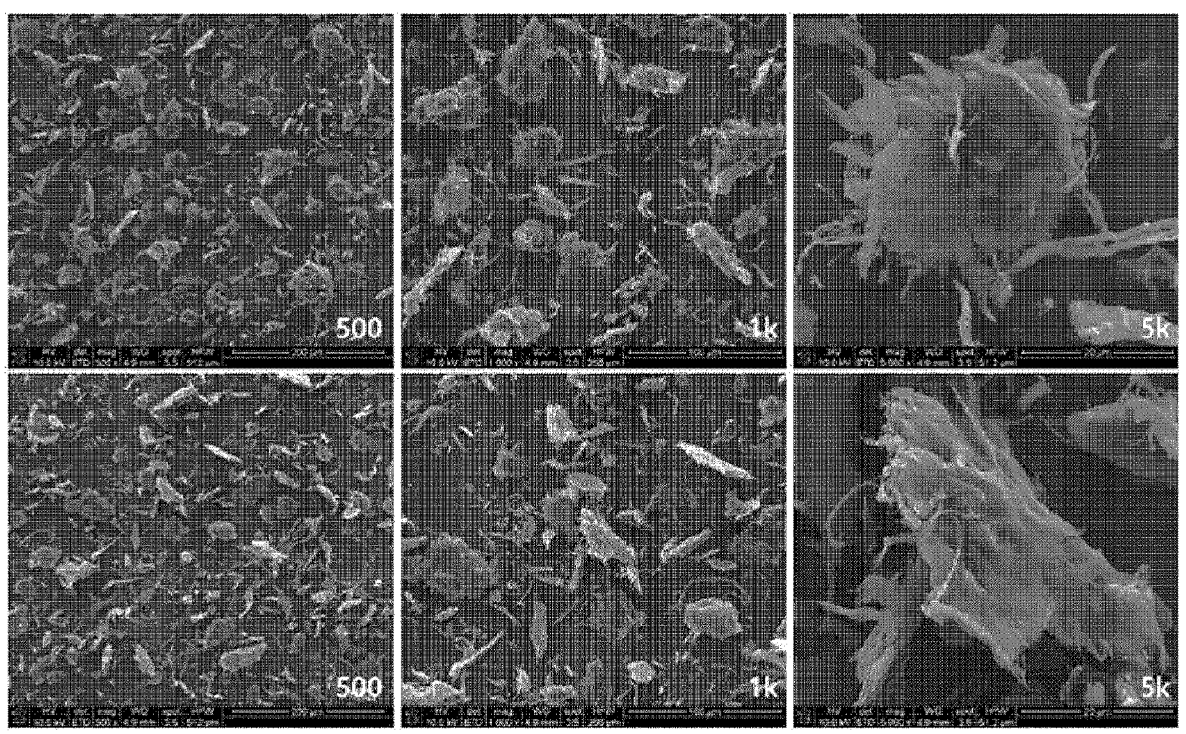
FIG. 4 is an SEM image of a carbon nanotube dispersion according to Example of the present disclosure.

FIG. 4 is an SEM image of a carbon nanotube dispersion according to Example of the present disclosure.

[Example 2] Preparation of Carbon Nanotube Dispersion (Average Length of 40 μm or Less)

First, pre-processing of the carbon nanotube length was performed at 700 rpm for 10 minutes by mixing zirconia balls (3 mm in diameter) and carbon nanotubes (JEIO, 10B) in an air dry mill (KMtech, KADM-5).

Next, 1 wt % of carbon nanotubes (average length of 40 μm) and 0.5 wt % of polyvinylpyrrolidone (PVP) were mixed with 98.5 wt % of a NMP solvent, and a carbon nanotube dispersion was prepared in a bead mill (WAB, DYNO-MILL ECM-AP) at a zirconia ball (1 mm in diameter) filling rate of 30% and a velocity of 1000 rpm.

Figure 5:
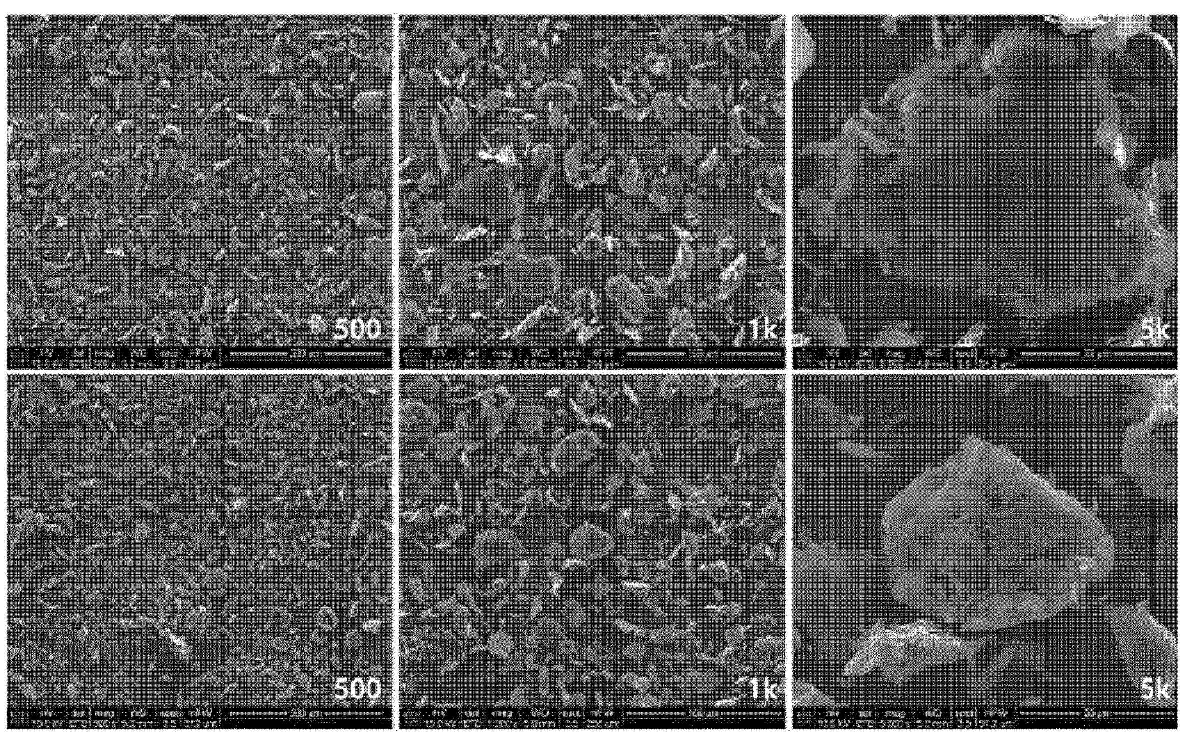
FIG. 5 is an SEM image of a carbon nanotube dispersion according to Example of the present disclosure.

FIG. 5 is an SEM image of a carbon nanotube dispersion according to Example of the present disclosure.

[Example 3] Preparation of Carbon Nanotube Dispersion (Average Length of 30 μm or Less)

First, pre-processing of the carbon nanotube length was performed at 700 rpm for 15 minutes by mixing zirconia balls (3 mm in diameter) and carbon nanotubes (JEIO, 10B) in an air dry mill (KMtech, KADM-5).

Next, 1 wt % of carbon nanotubes (average length of 30 μm) and 0.5 wt % of polyvinylpyrrolidone (PVP) were mixed with 98.5 wt % of a NMP solvent, and a carbon nanotube dispersion was prepared in a bead mill (WAB, DYNO-MILL ECM-AP) at a zirconia ball (1 mm in diameter) filling rate of 30% and a velocity of 1000 rpm.

Figure 6:
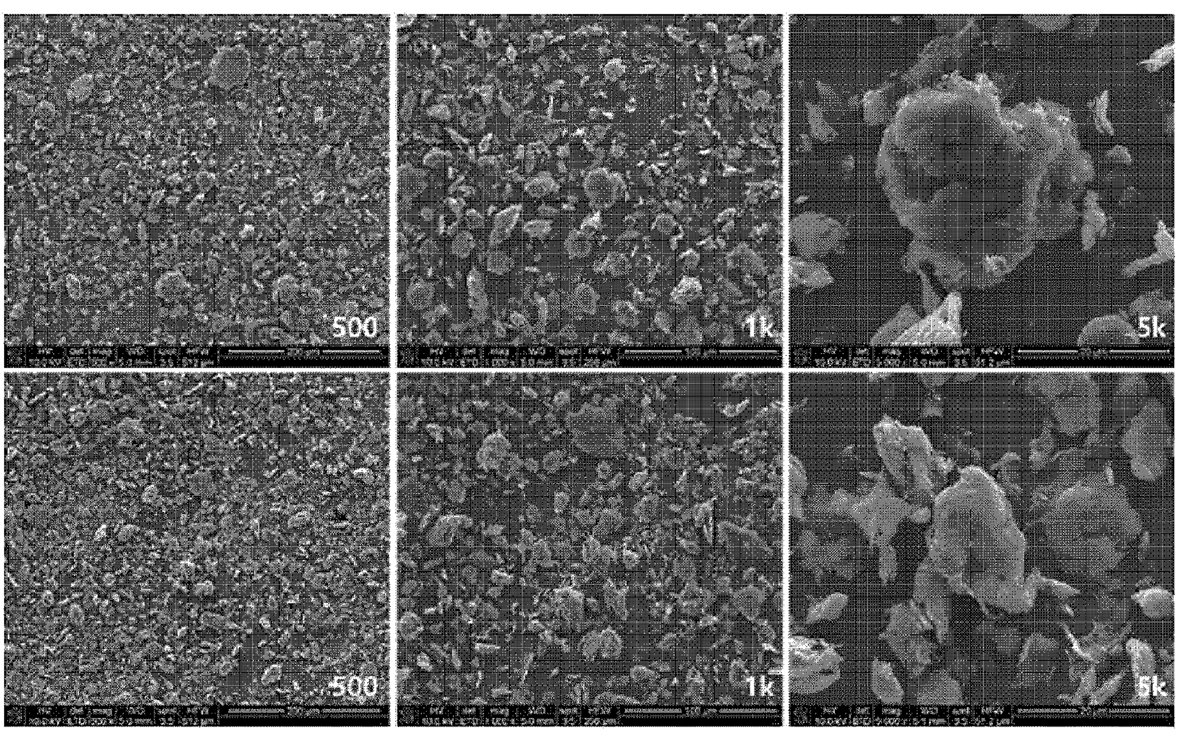
FIG. 6 is an SEM image of a carbon nanotube dispersion according to Example of the present disclosure.

FIG. 6 is an SEM image of a carbon nanotube dispersion according to Example of the present disclosure.

[Example 4] Preparation of Carbon Nanotube Dispersion (Average Length of 25 μm or Less)

First, pre-processing of the carbon nanotube length was performed at 700 rpm for 20 minutes by mixing zirconia balls (3 mm in diameter) and carbon nanotubes (JEIO, 10B) in an air dry mill (KMtech, KADM-5).

Next, 1 wt % of carbon nanotubes (average length of 25 μm) and 0.5 wt % of polyvinylpyrrolidone (PVP) were mixed with 98.5 wt % of a NMP solvent, and a carbon nanotube dispersion was prepared in a bead mill (WAB, DYNO-MILL ECM-AP) at a zirconia ball (1 mm in diameter) filling rate of 30% and a velocity of 1000 rpm.

Figure 7:
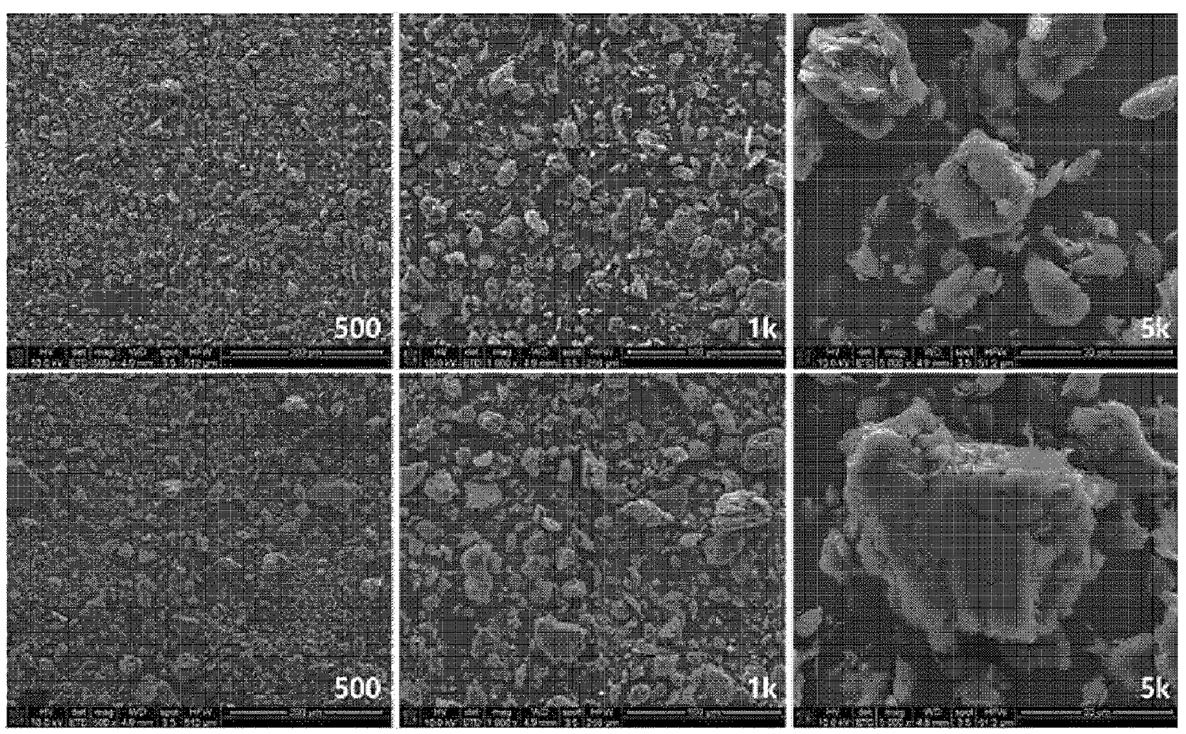
FIG. 7 is an SEM image of a carbon nanotube dispersion according to Example of the present disclosure.

FIG. 7 is an SEM image of a carbon nanotube dispersion according to Example of the present disclosure.

[Example 5] Preparation of Carbon Nanotube Dispersion (Average Length of 20 μm or Less)

First, pre-processing of the carbon nanotube length was performed at 700 rpm for 25 minutes by mixing zirconia balls (3 mm in diameter) and carbon nanotubes (JEIO, 10B) in an air dry mill (KMtech, KADM-5).

Next, 1 wt % of carbon nanotubes (average length of 20 μm) and 0.5 wt % of polyvinylpyrrolidone (PVP) were mixed with 98.5 wt % of a NMP solvent, and a carbon nanotube dispersion was prepared in a bead mill (WAB, DYNO-MILL ECM-AP) at a zirconia ball (1 mm in diameter) filling rate of 30% and a velocity of 1000 rpm.

Figure 8:
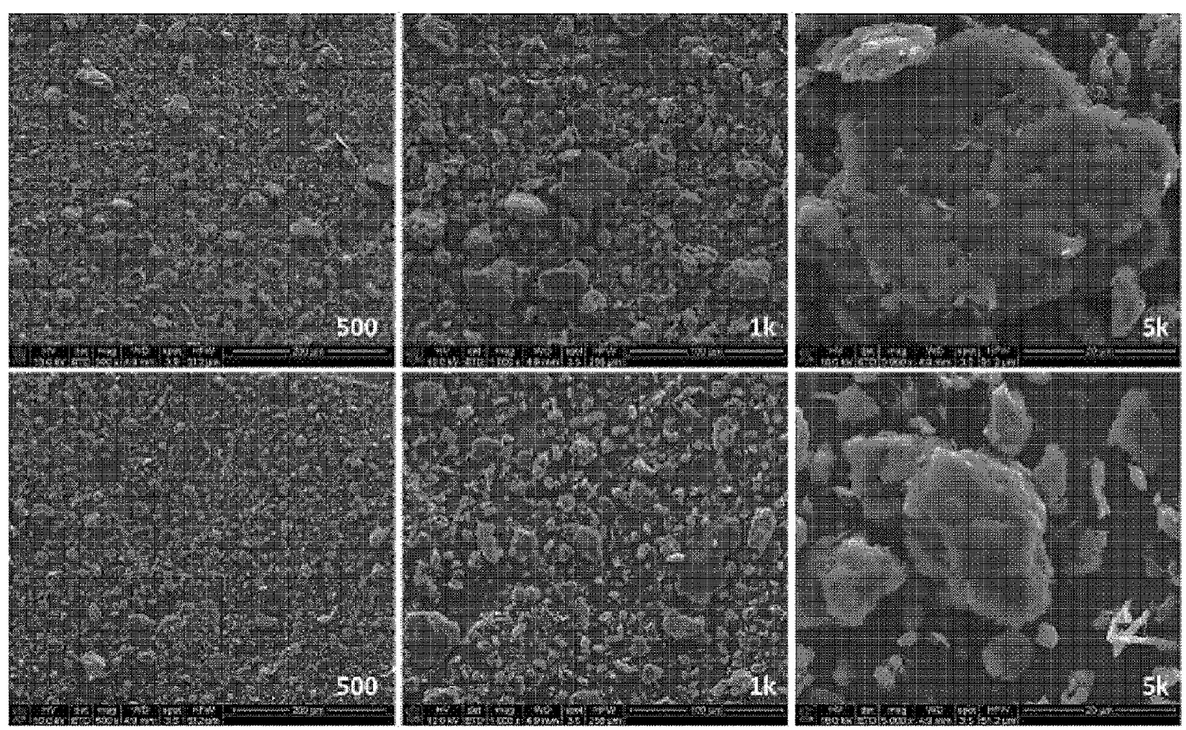
FIG. 8 is an SEM image of a carbon nanotube dispersion according to Example of the present disclosure.

FIG. 8 is an SEM image of a carbon nanotube dispersion according to Example of the present disclosure.

[Example 6] Preparation of Carbon Nanotube Dispersion (Average Length of 10 μm or Less)

First, pre-processing of the carbon nanotube length was performed at 700 rpm for 30 minutes by mixing zirconia balls (3 mm in diameter) and carbon nanotubes (JEIO, 10B) in an air dry mill (KMtech, KADM-5).

Next, 1 wt % of carbon nanotubes (average length of 10 μm) and 0.5 wt % of polyvinylpyrrolidone (PVP) were mixed with 98.5 wt % of a NMP solvent, and a carbon nanotube dispersion was prepared in a bead mill (WAB, DYNO-MILL ECM-AP) at a zirconia ball (1 mm in diameter) filling rate of 30% and a velocity of 1000 rpm.

Figure 9:
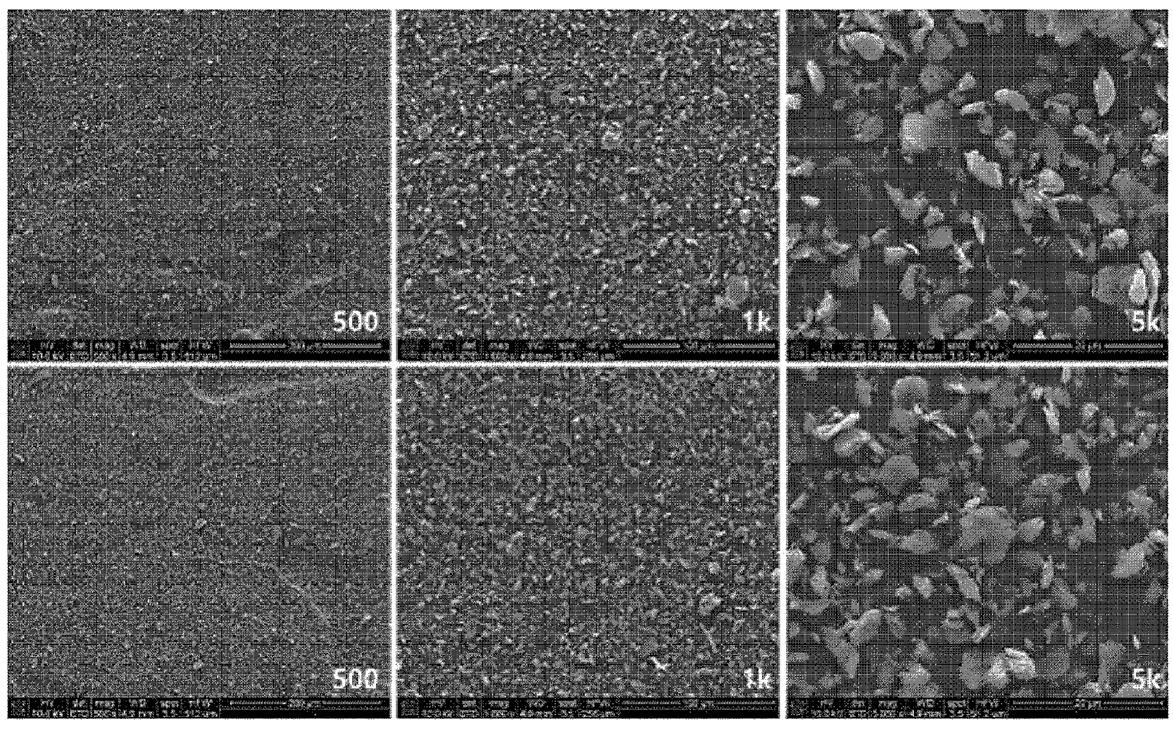
FIG. 9 is an SEM image of a carbon nanotube dispersion according to Example of the present disclosure.

FIG. 9 is an SEM image of a carbon nanotube dispersion according to Example of the present disclosure.

[Comparative Example 1] Preparation of Carbon Nanotube Dispersion (Average Length of 50 μm or More)

A dispersion was prepared according to Comparative Example of the present disclosure without controlling the length by post-processing the carbon nanotube bundle.

1 wt % of carbon nanotubes (average length of 50 μm or more) and 0.5 wt % of polyvinylpyrrolidone (PVP) were mixed with 98.5 wt % of a NMP solvent, and a carbon nanotube dispersion was prepared in a bead mill (WAB, DYNO-MILL ECM-AP) at a zirconia ball (1 mm in diameter) filling rate of 30% and a velocity of 1000 rpm.

Figure 10:
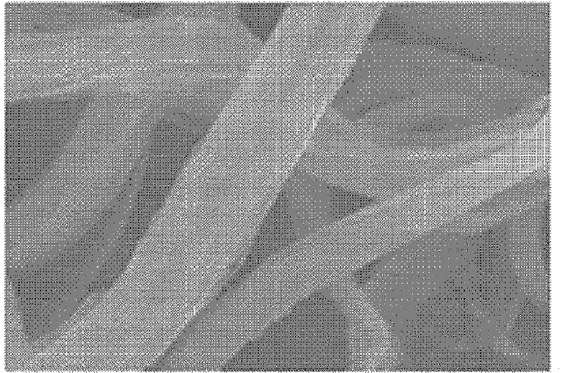
FIG. 10 is an SEM image of a carbon nanotube dispersion according to Comparative Example of the present disclosure.
Figure 10:
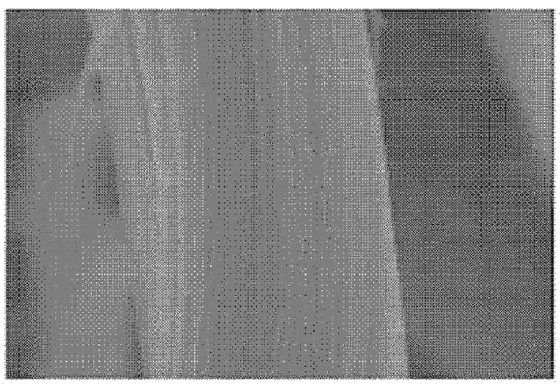

FIG. 10 is an SEM image of a carbon nanotube dispersion according to Comparative Example of the present disclosure.

Experimental Example 1

Figure 11:
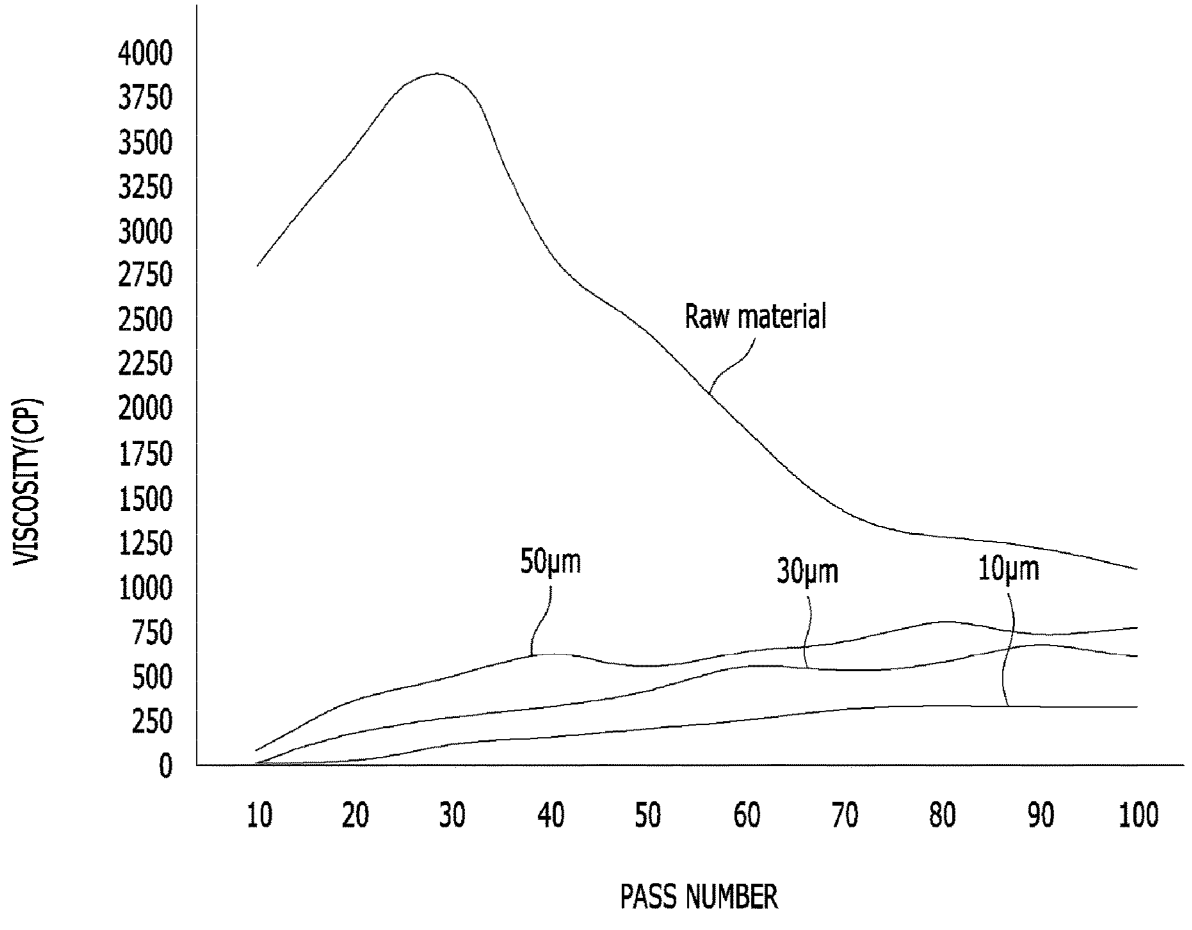
FIG. 11 is a distributed energy-viscosity curve according to the length of carbon nanotubes according to Experimental Example of the present disclosure.

FIG. 11 is a distributed energy-viscosity curve according to the length of carbon nanotubes according to Experimental Example of the present disclosure. Specifically, FIG. 11 is a graph showing changes in viscosity measured in a process of preparing the dispersions of carbon nanotubes post-processed in Comparative Example 1, Example 1, Example 3, and Example 6 through a bead mill process.

Referring to FIG. 11, it may be seen that the carbon nanotubes (raw material) of Comparative Example 1, of which the length was not controlled through post-processing, show irregular viscosity changes in which the viscosity increased and then decreased as dispersion energy was applied.

On the other hand, it may be seen that in the carbon nanotubes of Examples 1 (50 μm or less), 3 (30 μm or less), and 6 (10 μm or less) of which the length was controlled through post-processing, a section in which the viscosity gradually increased and then became constant occurred.

[Table 1] below is a table showing actually measured viscosity values of Experimental Example 1.

TABLE 1

| Pass number | viscosity (cp) | | | |
|---|---|---|---|---|
| (Bead mill Process, Requiring 30 minutes per pass) | Raw material | 50 μm or less | 30 μm or less | 10 μm or less |
| 10 | 2809 | 83 | 13 | 5 |
| 20 | 3489 | 365.9 | 186 | 30 |
| 30 | 3880 | 500 | 277 | 116 |
| 40 | 2880 | 623.9 | 332.9 | 158 |
| 50 | 2430 | 553 | 425.9 | 214 |
| 60 | 1890 | 640.9 | 557.8 | 255.9 |
| 70 | 1429 | 691.9 | 535.9 | 317.9 |
| 80 | 1300 | 808.8 | 579.9 | 335.9 |
| 90 | 1229 | 733.8 | 679.9 | 329.9 |
| 100 | 1099 | 783.8 | 611.9 | 333.9 |

Through this, it was confirmed that the viscosity change aspect was different from the conventional viscosity change aspect when performing the dispersion process by controlling the length of the carbon nanotubes, and it was confirmed that the saturation point according to the dispersion energy of viscosity increased in proportion to the average length of the carbon nanotubes. In addition, it is considered that it is possible to predict and improve dispersion process efficiency using these properties.

Experimental Example 2

Figure 12:
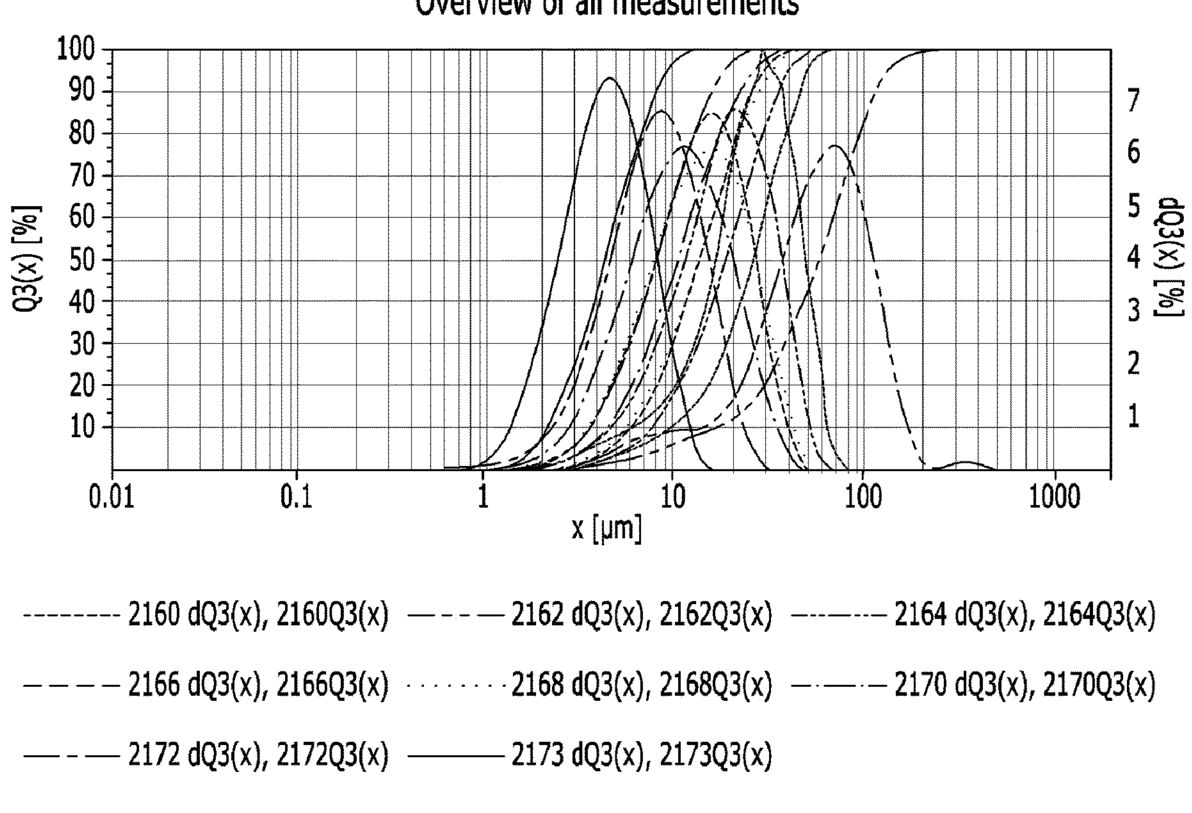
FIG. 12 is a graph of volume-average particle size distribution and volume-average cumulative particle size distribution according to Experimental Example of the present disclosure.

FIG. 12 is a graph of volume-average particle size distribution and volume-average cumulative particle size distribution according to Experimental Example of the present disclosure. Specifically, a graph that increases and then becomes constant is a volume-based cumulative particle size distribution graph, and a graph that increases and then decreases is a volume-based particle size distribution graph.

The volume-based cumulative particle size distribution refers to a cumulative curve, and is represented as a percentage of particles smaller than the particles to be considered. For example, if Q3(x)[%] on a left y-axis is 10, it represents the size at 10% of the entire particle size distribution.

The volume-based particle size distribution refers to a ratio of the volume of particles to be considered to the volume of the particles. Accordingly, all the numbers in dQ3(x)[%] on a right y-axis corresponding to each particle size are added to become 100.

Referring to FIG. 12, it may be visually confirmed that the particle size decreases as the post-processing time increases. Specifically, a green graph on the far right shows a volume-average particle size distribution and volume-average cumulative particle size distribution of a carbon nanotube bundle (average length of carbon nanotubes of 50 μm or more) of which the length was not controlled through post-processing. The remaining graphs show carbon nanotubes of which the length was has been controlled through post-processing, and carbon nanotubes having the average lengths of carbon nanotubes of 50 μm or less, 40 μm or less, 30 μm or less, 25 μm or less, 20 μm or less, and 10 μm or less in order from the right.

[Table 2] below shows quantifying the particle sizes of Dv(10), Dv(50), and Dv(90) in FIG. 11.

TABLE 2

| Dv(x) | 50 μm or more | 50 μm or less | 40 μm or less | 30 μm or less | 25 μm or less | 20 μm or less | 10 μm or less |
|---|---|---|---|---|---|---|---|
| 10 | 15.7 | 9.2 | 7.3 | 5.4 | 4.3 | 3.4 | 2.1 |
| 50 | 57.1 | 25.7 | 18.6 | 13.5 | 10.4 | 8 | 4.3 |
| 90 | 117.2 | 45.4 | 35.4 | 27.9 | 22.3 | 15.5 | 8 |

Referring to [Table 2], it was confirmed that as the post-processing time increased, the length of the carbon nanotube was controlled to become smaller, and thus the value of Dv90 decreased, and it was confirmed that through the particle size of Dv(90), which referred to the size at 90% of the entire particle size distribution, the majority of particles were 50 μm or more, 50 μm or less, 40 μm or less, 30 μm or less, 25 μm or less, 20 μm or less, and 10 μm or less.

The aforementioned description of the present disclosure is to be exemplified, and it will be understood by those skilled in the art that the present disclosure may be easily modified in other detailed forms without changing the technical spirit or required features of the present disclosure. Therefore, it should be appreciated that the examples described above are illustrative in all aspects and are not restricted. Therefore, it should be appreciated that the exemplary embodiments described above are illustrative in all aspects and are not restricted.

The scope of the present disclosure is represented by appended claims to be described below rather than the detailed description, and it is to be interpreted that the meaning and scope of the claims and all the changes or modified forms derived from the equivalents thereof come within the scope of the present disclosure.

The invention claimed is:

1. A method for preparing a carbon nanotube dispersion, comprising:

preparing a carbon nanotube bundle;

post-processing the carbon nanotube bundle to reduce an average length of the carbon nanotube bundle to 50 μm or less; and dispersing the carbon nanotube bundle in a solution, wherein a volume-based particle size Dv (90) of the carbon nanotube bundle is 50 μm or less, wherein the solution includes a solvent and a dispersant, wherein the solvent is at least one of deionized water, N-methyl-2-pyrrolidone, or a combination thereof, wherein the dispersant is at least one of polyvinylpyrrolidone, hydrogenated nitrile rubber, or a combination thereof, wherein the dispersing is performed using a bead mill, wherein the post-processing is performed by dry milling using an air dry mill, wherein a saturation point according to a dispersion energy of a viscosity (μ) of the carbon nanotube dispersion is proportional to an average length value of the carbon nanotube bundle, and wherein the viscosity of the carbon nanotube dispersion increases and then becomes saturated as the dispersion energy increases.

2. The method for preparing the carbon nanotube dispersion of claim 1, wherein the carbon nanotube bundle is prepared by chemical vapor deposition in a presence of a catalyst.

3. The method for preparing the carbon nanotube dispersion of claim 2, wherein the catalyst is selected from a group consisting of Fe, Co, Ni, Al, Mg, Mo, Si, and combinations thereof.

4. The method for preparing the carbon nanotube dispersion of claim 2, wherein the catalyst is prepared by a method selected from a group consisting of a combusting method, a supporting method, a probing method, a sol-gel method, and combinations thereof.

5. The method for preparing the carbon nanotube dispersion of claim 1, wherein the carbon nanotube bundle is prepared using a reaction source selected from a group consisting of acetylene, ethylene, methane, and combinations thereof.

6. The method for preparing the carbon nanotube dispersion of claim 1, wherein the carbon nanotube bundle has a specific surface area of 50 cm2/g or more and a diameter of 1 nm or more.

* * * * *